United States Patent [19]

Menin

[11] 4,439,844
[45] Mar. 27, 1984

[54] SALMON COUNTER WITH SEPARATE KING SALMON TABULATOR

[75] Inventor: Albert S. Menin, Sylmar, Calif.

[73] Assignee: The Bendix Corporation, Southfield, Mich.

[21] Appl. No.: 308,757

[22] Filed: Oct. 5, 1981

[51] Int. Cl.³ .............................................. G01S 15/96
[52] U.S. Cl. ....................................... 367/87; 367/108
[58] Field of Search ........................ 367/87, 93, 97, 98, 367/108

[56] References Cited

U.S. PATENT DOCUMENTS 4,034,331  7/1977  Menin et al. ........................ 367/97 X
4,225,951  9/1980  Menin et al. ........................... 367/105

Primary Examiner—Richard A. Farley
Attorney, Agent, or Firm—Robert C. Smith; W. F. Thornton

[57] ABSTRACT

A sonar fish counter, primarily for counting salmon migrating in streams and for providing a separate count of king salmon, includes a narrow beamwidth side-scanning sonar transducer directed to insonify a volume of water in the stream directly above a mechanical beam which serves as an artificial bottom. The transducer transmits pulses of short duration such as 100 microseconds at regular intervals. After a delay following a transmitted pulse, a receiver is enabled to receive echo signals from any fish crossing the artificial bottom. During the period the receiver is enabled, a ring counter separates the return echoes on the basis of the return time from respective sectors of the bottom structure, and these returns are separately counted for each sector so that the counts may be displayed or printed separately. To deal with unusually high counts which may indicate that long term debris which has fastened to the beam or peak periods of fish migration, a counter arrangement is provided which counts all received echoes on a sector-by-sector basis and responds to a predetermined high count in any sector by either disabling the sector for a period or by providing a special print character which the operator may determine as representing either debris or a high fish count (as during the peak of migration). A discrimination circuit connected to the receiver separates the return pulses which are of unusual length, such as those over 300 microseconds, and supplies them to a separate counting structure since such elongated pulses represent king salmon. The counter and display means may then provide counts of all salmon by sector (across the artificial bottom) plus a separate count of king salmon plus a total. These totals may be recorded and the counter reset at any desired time interval, such as each hour.

6 Claims, 5 Drawing Figures

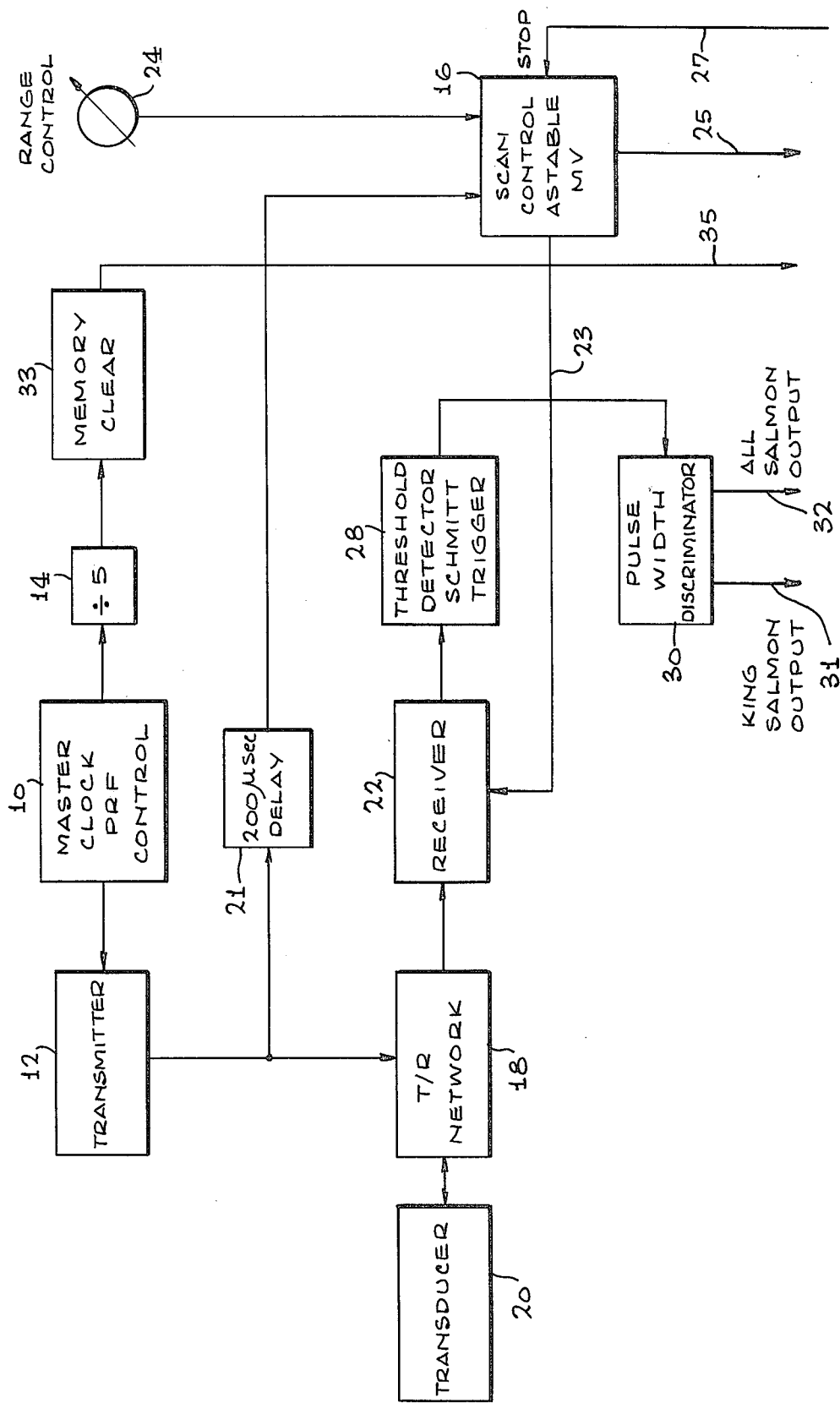

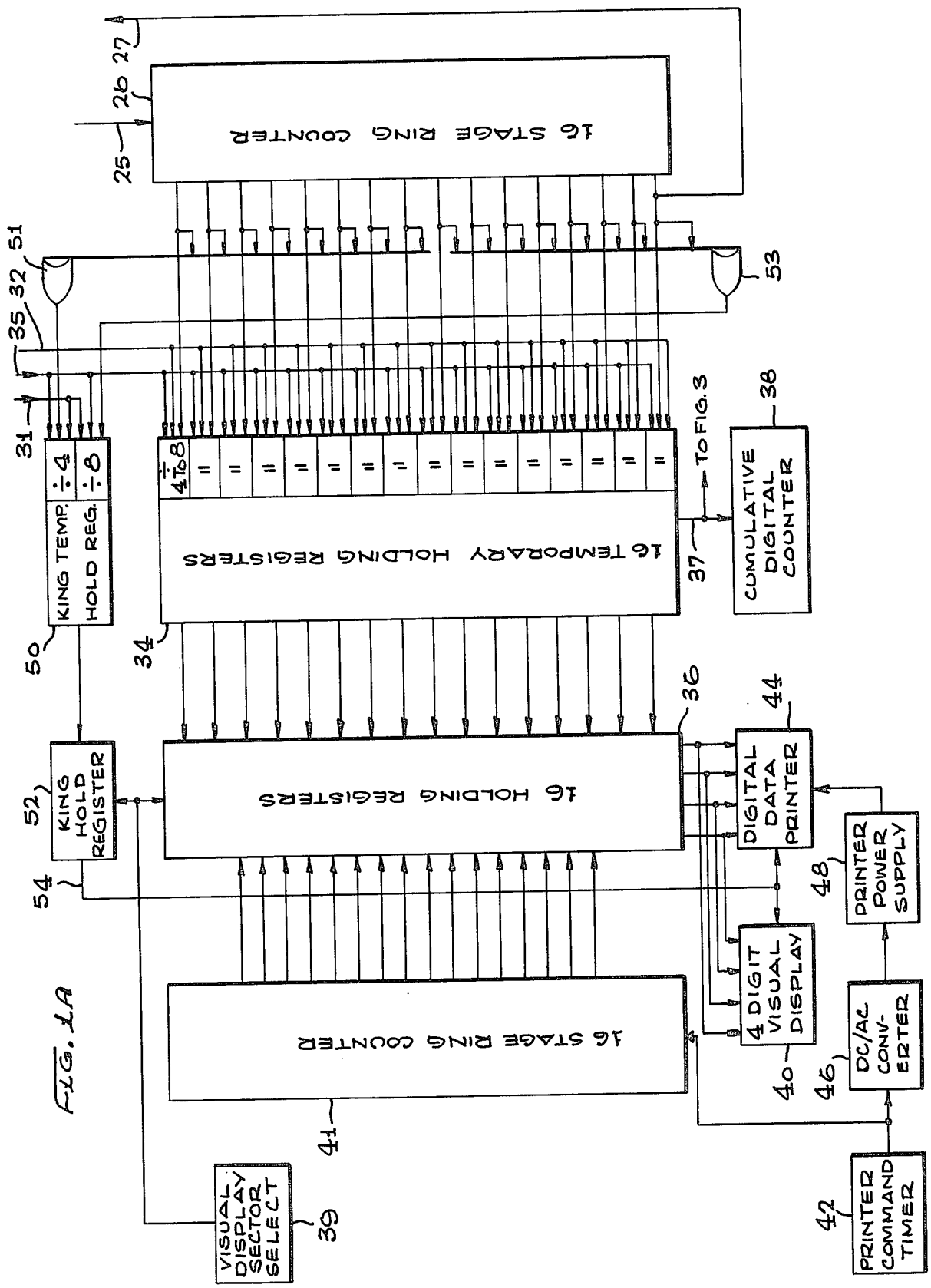

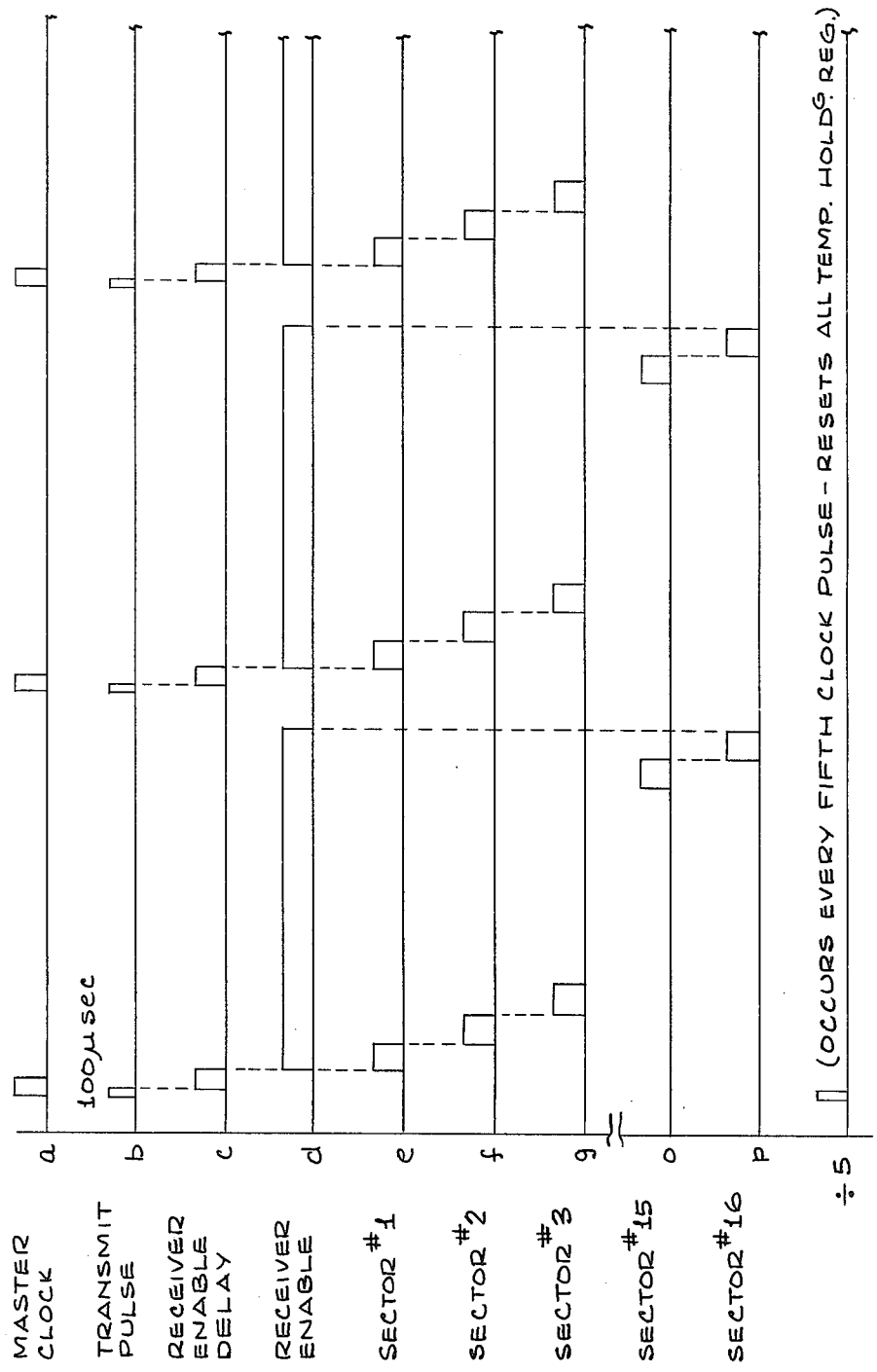

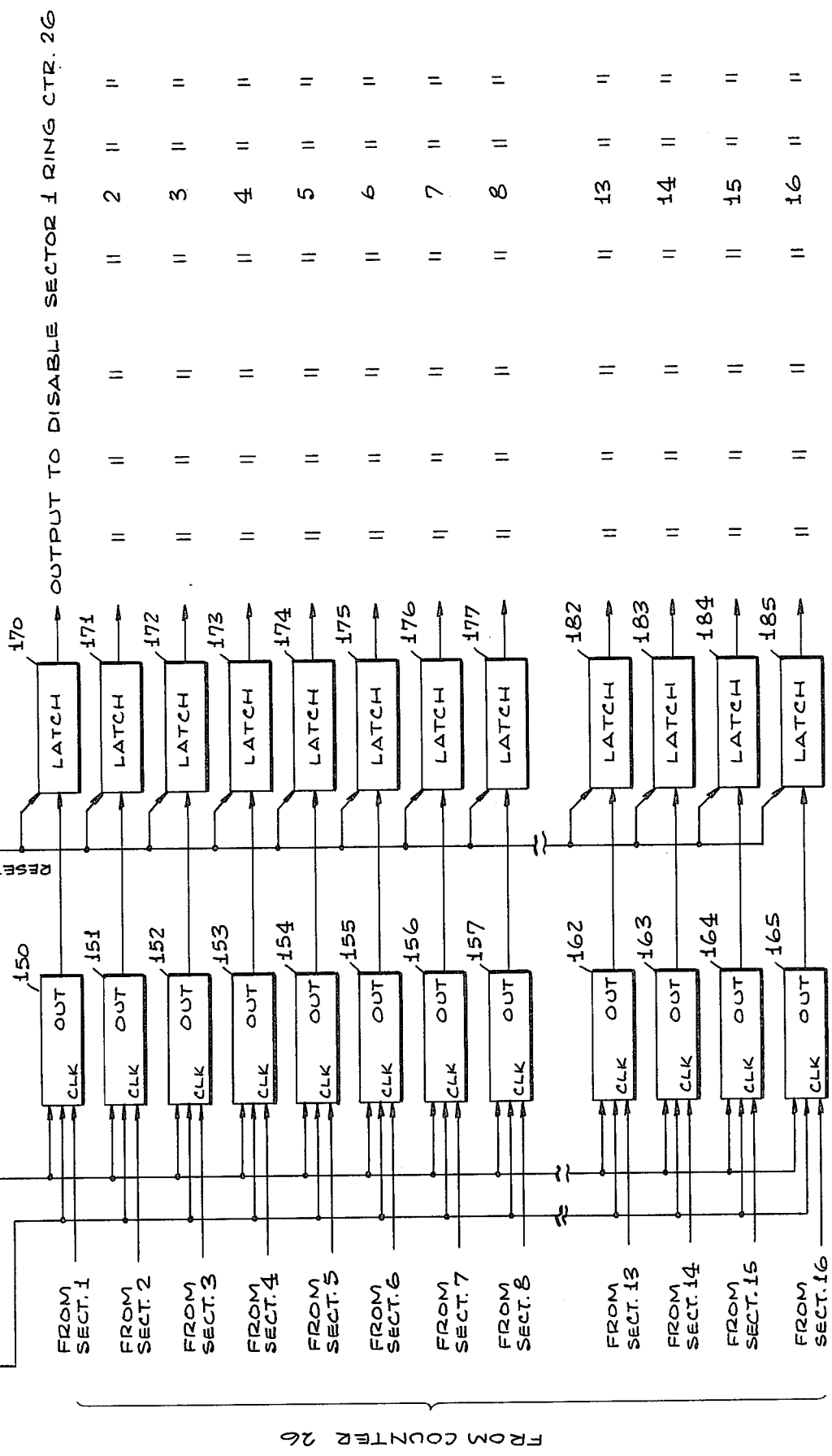

SALMON COUNTER WITH SEPARATE KING SALMON TABULATOR

This invention relates to sonar fish counters and more particularly to a counter for counting migrating salmon.

A recent type of side scanning sonar salmon counter is disclosed in U.S. Pat. No. 4,034,331. This counter has advantages over certain earlier types using a large number of upward looking transducers in that it requires only a single piezoelectric transducer element and can be operated in smaller, shallower streams.

Game and Fish authorities have more recently expressed a desire to count king salmon which are considerably larger than the other salmon species usually counted. The count normally produced by the above described side scanning sonar counter includes whatever king salmon are present but does not distinguish between king salmon and other salmon.

The invention herein describes a side scanning salmon counter similar to the one described in the above patent, but includes a novel new feature enabling a separate count of king salmon in addition to the count of all salmon. Applicant has discovered that when a standard sonar pulse is transmitted of such width as 100 microseconds, the reflected pulses appearing at the receiver tend to be somewhat extended and the echoes representing king salmon were extended to 300 microseconds or more. Other salmon and debris returned pulses which were, in essentially all cases, less than 275 microseconds. As discussed below, applicant separates pulse echoes of salmon from those of debris by taking into consideration the greater time the salmon are in the beam and discriminating against which are too short to represent salmon.

The primary advantage of the present invention is that it makes it possible, with a relatively straightforward modification of the basic side scanning sonar design, to provide a separate count of king salmon in addition to a count of all salmon.

Another significant advantage of the present invention is that it provides a means of counting king salmon in addition to all salmon with the same artificial bottom structure and the same transducer previously used to count all salmon.

The invention will now be described with respect to the accompanying drawings in which:

FIG. 1 is a schematic block diagram of a portion of the electrical circuits used in a salmon counter according to our invention.

FIG. 1A is a schematic block diagram of the remaining part of the electrical circuitry used in the counter of FIG. 1;

FIG. 2 is a timing diagram relating to the electrical organization of FIGS. 1 and 1A.

FIG. 3 is a schematic block diagram of a debris sensor which may be incorporated in the system of FIGS. 1 and 1A.

Figure 4:
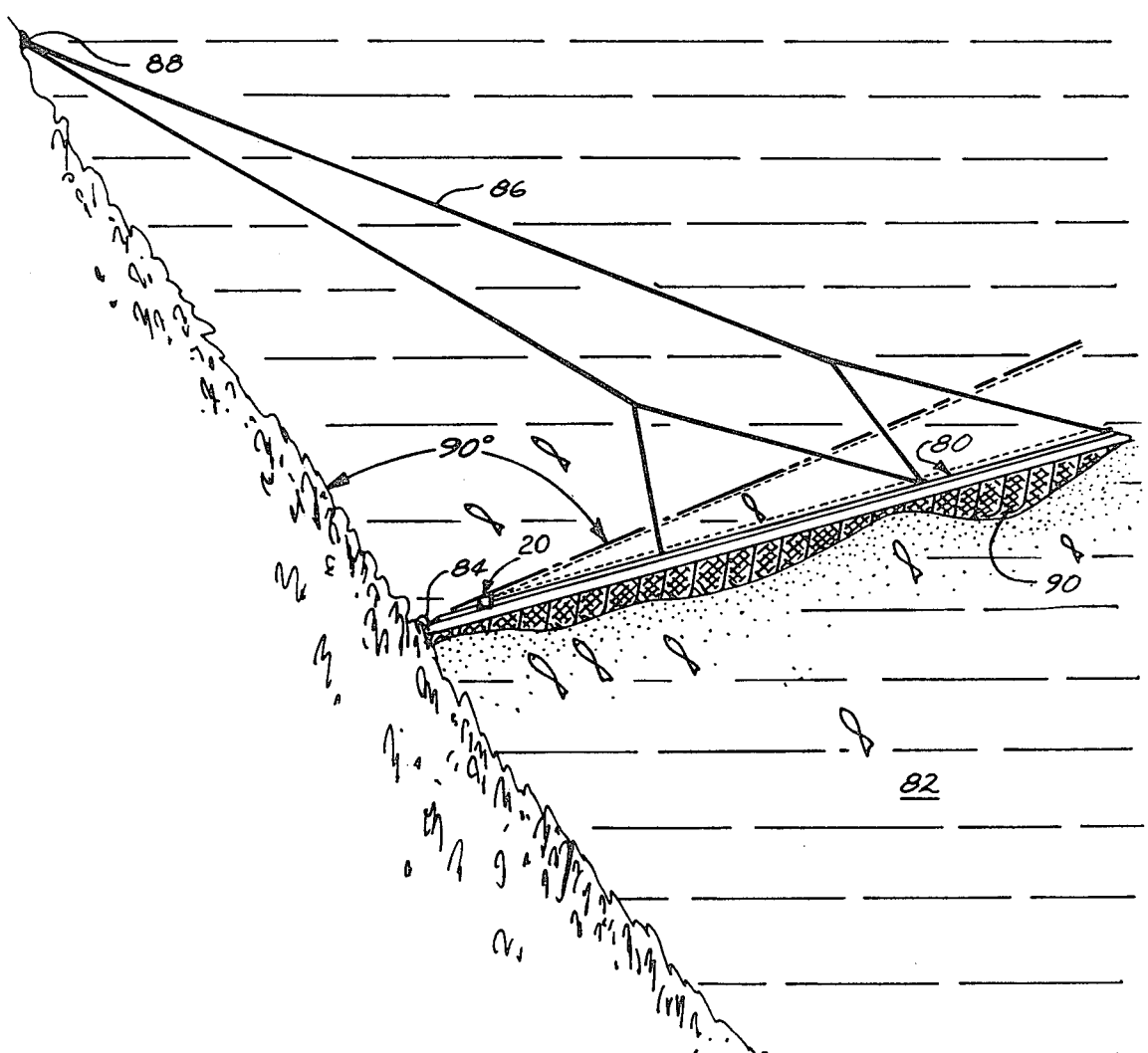
FIG. 4 is a perspective view of the artificial bottom structure used with the electrical organizations of FIGS. 1, 1A and 3 as deployed in a stream.

Referring now to FIGS. 1, 1A and 2, a master clock PRF control 10 produces pulses in the form of 100-microsecond bursts of 515 KHz which are supplied to a transmitter 12, to a divider 14 (divide by 5), and to a scan control 16 which is in the form of an astable multivibrator. The transmit pulse (see trace b, FIG. 2) from transmitter 12 is supplied to a transmit-receive network 18 and from there to an acoustic transducer 20 which transmits a 100-microsecond sonar signal having a 2° beam width. At the end of the 100-microsecond transmit pulse, a 200-microsecond delay is provided by a circuit 21 which is triggered by the trailing edge of the transmit pulse as shown on trace c. Following this delay, the scan control 16 then provides a receiver enable signal on line 23 which serves to enable a receiver 22 which then remains enabled for the round trip time required for the transmitted signal to intercept a fish at the maximum range selected by an operator net range control 24 (see FIG. 2, trace d). The receiver enable signal supplied to scan control 16 is transmitted through a line 25 to a 16-stage ring counter 26 which sequentially opens one of 16 gates permitting any data received to be entered in the register corresponding to the 1/16 of the river sector in which fish were detected (see traces e, f, g, o and p). Depending on the round trip time to a transmitted signal, the return echo signals are divided by time to represent a count of fish in each of 16 sectors of the river. After the signals from the sixteenth sector are received and transmitted, a pulse is transmitted along a line 27 to provide a "stop" signal which stops the scan control multivibrator 16 until the arrival of the next pulse from master clock 10.

Echo signals received at the receiver 22 are amplified to a usable level and are then supplied to a threshold detector and Schmitt trigger circuit 28. This detector responds to signals of sufficient amplitude to be the equivalent of the known target strength of a fish. For each received signal of sufficient amplitude, this detector and Schmitt trigger circuit produces a signal of essentially uniform amplitude, but of variable pulse width as received at the transducer 20. These pulses are supplied to a pulse width discriminator 30 which may be any of several known types and which responds to pulses of width in excess of 275 microseconds to produce output pulses to an output line 31 which represent king salmon counts. Another part of pulse width discriminator 30 responds to all pulses from threshold detector and Schmitt trigger 28 and produces pulses on line 32 representing all salmon including king salmon. Pulses from line 32 are supplied as inputs to each of sixteen divider circuits at the inputs to each of the sixteen temporary holding registers forming register 34, the particular divider circuit involved depending upon which is enabled by the ring counter 26. Since each of the inputs to the several divider circuits represent returns from a river sector at a different distance from the transducer 20 and since salmon which are farther from the transducer tend to be in the beam longer (because of its spread), the number of pulses tend to represent multiple returns from one salmon, but more returns from those salmon farther from the transducer. It has been determined experimentally that, for a typical installation, these divider circuits can be arranged to divide by any selected number from four through eight. Thus the dividers receiving pulses from inside sectors such as a, b, c and d (FIG. 2) might be preset to divide its input pulses by four; dividers receiving pulses from sectors e, f, g and h might be set to divide by five, and those dividers receiving pulses from sectors l, m, n, o and p might be set to divide by seven or eight. For a somewhat different installation these numbers may be somewhat different.

The king salmon output on line 31 is supplied to each of two special dividers at the input to a king salmon temporary holding register 50. For the king salmon count, it has been found sufficiently accurate to provide only two separate division factors. Thus the connections from the enabling ring counter provide that the divide-by-four divider is enabled for all returns from the near half of the river sectors (a through h), and the divide-by-eight divider is enabled for all returns from the far half of the river sectors (i through p). Thus the first eight counts from the ring counter 26 are connected through an "or" gate 51 to the divide-by-four divider and the second eight counts from the ring counter 26 are connected through "or" gate 53 to the divide-by-eight divider to enable the holding register 50.

Depending on the division factor, the temporary holding registers 34 and 50 will supply to holding registers 36 and 52, respectively, one count for each four through eight counts at the inputs to the divider circuits. Another input signal supplied to the temporary holding registers 34 and 50 comes from the divider circuit 14 (divide by 5) which responds to every fifth master clock pulse to supply a timing pulse to a "memory clear" device 33, providing an output pulse on a line 35 which clears all counts from the temporary holding registers 34 and 50 after which the registers are free to receive new data.

The rate of migration of salmon along the river bottom is about 1.75 feet per second, and the sampling rate is selected such that although each fish is normally sampled five times, only three valid detections are required to provide an input to registers 36 and 52. This feature performs two functions:
1. It permits the sampling of five different aspects of the same fish to increase the probability of fish detection, and
2. It substantially eliminates false counts due to waterborne debris, since most rivers where salmon migrate move at velocities in excess of 4 feet per second. Thus water-borne debris will be in the beam much less time than the salmon and will not be in sonar beam for the three required valid detections.

So considering any one "divide 4 through 8 circuit" of register 34 and inputs thereto, this sector is enabled for a short period by the corresponding stage of the 16-stage ring-counter 26. During this period, if at least four signal pulses are not received, no input signals are supplied to the corresponding sector of register 36 or 52. If four to eight or more signal pulses are received, depending upon the divisor one pulse will be supplied to register 36 or 52. Densities will not normally be such that more than one pulse is supplied to each of registers 36 or 52 before holding registers 34 are cleared. Thus any echoes meeting the criterion of being above the predetermined threshold for four out of five transmissions are thus entered in their respective range slots of the temporary register 34 or 50 and and then routed to register 36 or 52 as a single count. They are also routed through a line 37 to a single permanent cumulative memory and digital counter 38 where they are totalized. At any desired time, the operator may select by means of a selector switch 39 connected to holding registers 36 and 52 any one of its 16 river sectors for display on a visual display device 40 to see how many fish have been detected in each of the 16 river sectors or how many king salmon have been detected in total. Additionally, at operator-selected intervals a printer command timer 42 will cause the ring connector 41 to trigger holding registers 36 to cause the printer 44 to sequentially sample and print out each of the fish totals stored in the 16 sectors of register 36 to determine the lateral and chronological distribution of the fish migration. A seventeenth printer line prints out the total king salmon count for the selected period and an eighteenth line prints out the total of lines 1–16 for the selected period.

Since the power source for the counter may be a conventional automotive storage battery or a solar charged battery installation, the direct current output converted to alternating current in a d.c. to a.c. converter 46, and the a.c. output is supplied to a power supply 48 for operating the printer 44. Because the power consumption must be minimized, power to the receiver is automatically provided only during the receiver enable cycle and to the printer only during the time it is commanded to sequentially print the above described totals.

Because of the possibility that a tree branch or some other type of debris could become entangled or held to a portion of the artificial bottom structure, a debris sensor may be incorporated. Since such debris will tend to result in a very high number of reflections in a given period of time, a number significantly higher than would be caused by fish, the occurrence of such a number may be sensed and used to cause the corresponding portion of the register to discontinue storing counts. Means for accomplishing this are shown in FIG. 3. In this system the occurrence of 32 counts within a 42-second period within any 1/16 section of the artificial bottom structure is assumed to be debris and not fish. Other criteria could be used depending upon the normal fish densities to be expected. A series of 16 counters 150–165 is provided, each of which samples countts from one river sector as accumulated in holding registers 34 and supplied from line 37. A 42-second timer 74 is connected to each of said counters and automatically resets each to zero every 42 seconds. Thus, in normal operation no individual counter will accumulate 32 counts in 42 seconds, and so all counts are cleared. If counter 150, for example, were to accumulate over 32 counts before the clearing reset pulse arrives, counter 150 will then supply an output pulse to a latch circuit 170 which is one of 16 latches 170–185. Latch 170 will then supply an output pulse to disable sector 1 of the ring counter 26, thus discontinuing any transfer of counts to register 34. A reset pulse is also supplied to latches 170–185 from a timer 76 which conventionally forms part of the digital data printer 44. This print command reset cycle will normally be of substantially longer duration than the 36-second reset described above. Typically, such print command reset times are one hour, etc. The purpose of this reset function is to bring the disabled sector back into operation if the debris has cleared itself in a matter of a few minutes. Should the debris still be present, the above cycle will repeat, thus effectively keeping the disabled sector off the line. Whenever the debris is cleared, the sector will again operate at the end of the succeeding print command reset cycle. While the reset pulse to the latches 170–185 is described as being supplied from the printer timer, it could as well come from a separate timing device. Similarly the 32-second reset signal could come from the printer timer or any suitable source of timing signals. Neither of these timing signals need be coordinated with the master clock 10. One additional feature of the printer timer arrangement is that, since the fish count during peak migration can satisfy the debris criterion rather than disabling the sector, it can easily be made to respond to the actuation of one of the latches by printing a character on the printout record to indicate at which of the long-term reset cycles the high count (debris) was sensed.

The arrangement for deploying the artificial bottom is shown in FIG. 4. FIG. 4 is a perspective view of our artificial bottom structure 80 which is in the form of a truss or beam pivotally fastened at numeral 84 by suitable mounting means shown to the shore of a stream 82. The supporting means which holds structure 80 in a position essentially normal to the shoreline consists of a cable arrangement 86 attached to the shoreline at a point designated by numeral 88 upstream of pivot point 84. As shown, the cable arrangement 86 consists of two cables, each of which includes a pair of branching cables connected to structure 80 so that there are enough points of support for structure 80 to avoid substantial deformation or "bowing" due to action of the current. Alternatively, structure 80 may be made quite stiff so that a single cable 86 near the end will suffice. A flexible open wall of chains and webbing 90 depends from structure 80 to force the fish swimming upstsream to pass over structure 80. The structure 80 is shown in FIG. 4 in the water resting essentially on the bottom with the surface indicated by the dash-dot line.

The sonar transducer 20 is shown in the water adjacent the shoreline projecting a narrow sonar beam 20 along and immediately above the surface of structure 80, as shown by the dashed lines.

Those skilled in the art will recognize a number of ways which the above fish-counting assembly could be made diffferent from that described. The beam or truss structure, although made of PVC because of low cost and a need to make it light for portability, could be of other materials, some of which may be more rigid. Conventionally, the PVC truss structure and skin will be assembled from sections and panels of convenient length for carrying on trucks or aircraft. The aluminum skin adds very substantially to the rigidity of the truss, but it could be made even more rigid by using a skin of steel; however, this would result in greater weight. And while the numbers of sectors separately considered has been defined as 16, either smaller or larger numbers may be used. Where fewer sectors are acceptable, some reduction in the complexity of the electrical interconnections can be effected by using ten sectors, since ten-stage registers are commercially available. Another variable factor includes the dividers shown at numerals 14 and 34. While these provide four valid detections out of five samples, it may be that for any particular stream three, four or five detections out of four, five, six or seven sampling pulses may be preferable, and means for varying these divisors may be incorporated into the dividers 14 and 34.

I claim:

1. In a system for counting migrating fish swimming in a stream including a mechanical support structure adapted to be positioned on the bottom of said stream near the shore thereof and extending a substantial distance into said stream essentially perpendicularly with respect to the direction of stream flow including means forcing the fish to swim over said structure, an acoustic transducer having a narrow beam width positioned near the shore end of said structure and directed to insonify a volume of water in said stream immediately above said structure, and to receive echo return signals therefrom, electrical means connected to said transducer including a source of electrical power, a master clock connected to said source for emitting clock pulses at regular intervals, a transmitter responsive to said clock pulses for providing echo ranging pulse signals to said transducer, a delay circuit responsive to said transmitted pulses, a receiver connected to said transducer and threshold detector means connected to said receiver, a multistage ring counter providing a plurality of successive output pulses, a scan control multivibrator responsive to said delay circuit for enabling said receiver and for enabling said ring counter, a first holding register having a plurality of stages corresponding to the number of stages of said ring counter including a divider circuit at the input to each stage and connections from each stage of said ring counter to a corresponding one of said divider circuits to thereby provide pulse signals to each stage of said holding register representing one sector along the length of said mechanical support structure;

means connecting said multivibrator means to each of said divider circuits;

divider means connected to said master clock, and means responsive to said divider means output for providing a reset signal to each of said divider circuits;

a second holding register having a number of stages corresponding to the number of stages of said ring counter and said first named holding register and means interconnecting corresponding stages of said holding registers;

and display means connected to said second holding register including timer means;

means providing a separate count of king salmon including a pulse width discriminator connected to said receiver and threshold detector means for separating from the received pulses a group of pulses of longer duration representing king salmon, separate holding register means including divider circuit means connected to receive the pulses representing king salmon and means connecting said ring counter and said divider circuit means to said separate holding register means, said display means including means connected to said separate holding register means for separately displaying the counts of king salmon.

2. In a system for counting migrating fish swimming in a stream including a mechanical support structure adapted to be positioned on the bottom of said stream extending a substantial distance into said stream essentially perpendicularly with respect to the direction of stream flow including means forcing the fish to swim over said structure, an acoustic transducer having a narrow beam width directed to insonify a volume of water in said stream immediately above said structure, and to receive echo return signals therefrom, electrical means connected to said transducer including a source of electrical power, a master clock connected to said source for emitting clock pulses at regular intervals, a transmitter responsive to said clock pulses for providing echo ranging pulse signals to said transducer, a receiver connected to said transducer and threshold detector means connected to said receiver, a delay circuit responsive to said transmitted pulses, counter means providing a plurality of successive output pulses, multivibrator means responsive to said delay circuit for enabling said receiver and said counter means, a first holding register having a plurality of stages including a divider circuit at the input to each stage and connections from said receiver and threshold detector and said counter means to each said stage to thereby provide enabling pulse signals to each stage whose timing is such as to cause each stage to receive detected signals representing one sector along the length of said mechanical support structure, divider means connected to said master clock, and means responsive to said divider means output for providing a reset signal to each of said divider circuits;

a second holding register having a number of stages corresponding to the number of stages of said ring counter and said first named holding register and means interconnecting corresponding stages of said holding registers; and display means including timer means connected to said second holding register:

characterized in that means are provided for accumulating and displaying a separate count of king salmon comprising pulse shaping means in said threshold detector means, a pulse width discriminator connected to said threshold detector means separately responding to received detected pulses of a predetermined duration or width representing king salmon, separate holding register means including divider circuit means connected to receive the pulses representing king salmon and means connecting said counter means and said divider circuit means to said separate holding register means, said display means including means connected to said separate holding register means for separately displaying the counts of king salmon.

3. A system for counting fish as set forth in claim 2 wherein said display means includes a digital data printer including timing means, said timing means being adjustable to print out the contents of each stage of said second holding register and said separate holding register.

4. A system for counting migrating fish as set forth in claim 2 wherein said display means includes digital visual display means and operator-operated means for selecting the display representing the count for the desired sector of said mechanical support structure as well as the total count of king salmon.

5. A system for counting migrating fish as set forth in claim 2 wherein said counter means includes means responsive to the expiration of the period for reception of echoes from the most distant sector of said mechanical support structure for providing a pulse to said multivibrator means to disable said receiver.

6. A system for counting migrating fish as set forth in claim 2 wherein said pulse shaping means in said threshold detector means is a Schmitt trigger and said counter means is a ring counter having separate output pulses for each stage of said first holding register.

* * * * *